US012645065B2

(12) United States Patent
Miller et al.

(10) Patent No.: US 12,645,065 B2
(45) Date of Patent: Jun. 2, 2026

(54) SPATIAL PERIOD CONVERTER WITH MONOLITHIC ZOOM

(71) Applicant: Quantinuum LLC, Broomfield, CO (US)

(72) Inventors: David Miller, Broomfield, CO (US); Ryan Murdick, Broomfield, CO (US)

(73) Assignee: QUANTINUUM LLC, Broomfield, CO (US)

( * ) Notice: Subject to any disclaimer, the term of this patent is extended or adjusted under 35 U.S.C. 154(b) by 374 days.

(21) Appl. No.: 18/322,829

(22) Filed: May 24, 2023

(65) Prior Publication Data

US 2024/0329389 A1 Oct. 3, 2024

Related U.S. Application Data

(60) Provisional application No. 63/368,531, filed on Jul. 15, 2022.

(51) Int. Cl.
*G02B 26/08* (2006.01)

(52) U.S. Cl.
CPC ................................ *G02B 26/0825* (2013.01)

(58) Field of Classification Search
CPC .................. G02B 26/0825; G02B 27/0905; G02B 7/005; G02B 26/0816; G02B 27/14; G02B 17/008; G02B 26/06
See application file for complete search history.

(56) References Cited

U.S. PATENT DOCUMENTS 6,465,355 B1 * 10/2002 Horsley .............. B81C 1/00142
438/700
6,466,711 B1 * 10/2002 Laor .................... G02B 6/3556
385/18

(Continued)

FOREIGN PATENT DOCUMENTS

CN 110635354 A 12/2019
CN 113231733 A 8/2021

(Continued)

OTHER PUBLICATIONS

De Jong, Boudewijn R., "A Six Degrees of Freedom MEMS Manipulator", Ph.D. Thesis, University of Twente, Nov. 3, 2006, retrieved from the Internet at URL:https://research.utwente.nl/en/publications/a-six-degrees-of-freedom-mems-manipu lator on Oct. 27, 2023, 211 pages.

(Continued)

*Primary Examiner* — Euncha P Cherry
(74) *Attorney, Agent, or Firm* — ALSTON & BIRD LLP

(57) ABSTRACT

Provided is a novel beam delivery system comprising an optical beam spatial period converter. The converter comprises a substrate comprising two or more flexures coupled in series; a plurality of first spacing reflective elements and a plurality of second spacing reflective elements disposed on surface of the substrate. Each first spacing reflective element is configured to receive a respective incoming beam of an incoming array of beams and redirect the respective incoming beam to provide an intermediate beam to a respective second spacing reflective element. Each second spacing reflective element is configured to receive a respective intermediate beam and redirect the respective intermediate beam to provide a respective outgoing beam. The respective outgoing beam is one of plurality of outgoing beams that form an outgoing array of beams. The outgoing array of (Continued)

Figure 1:
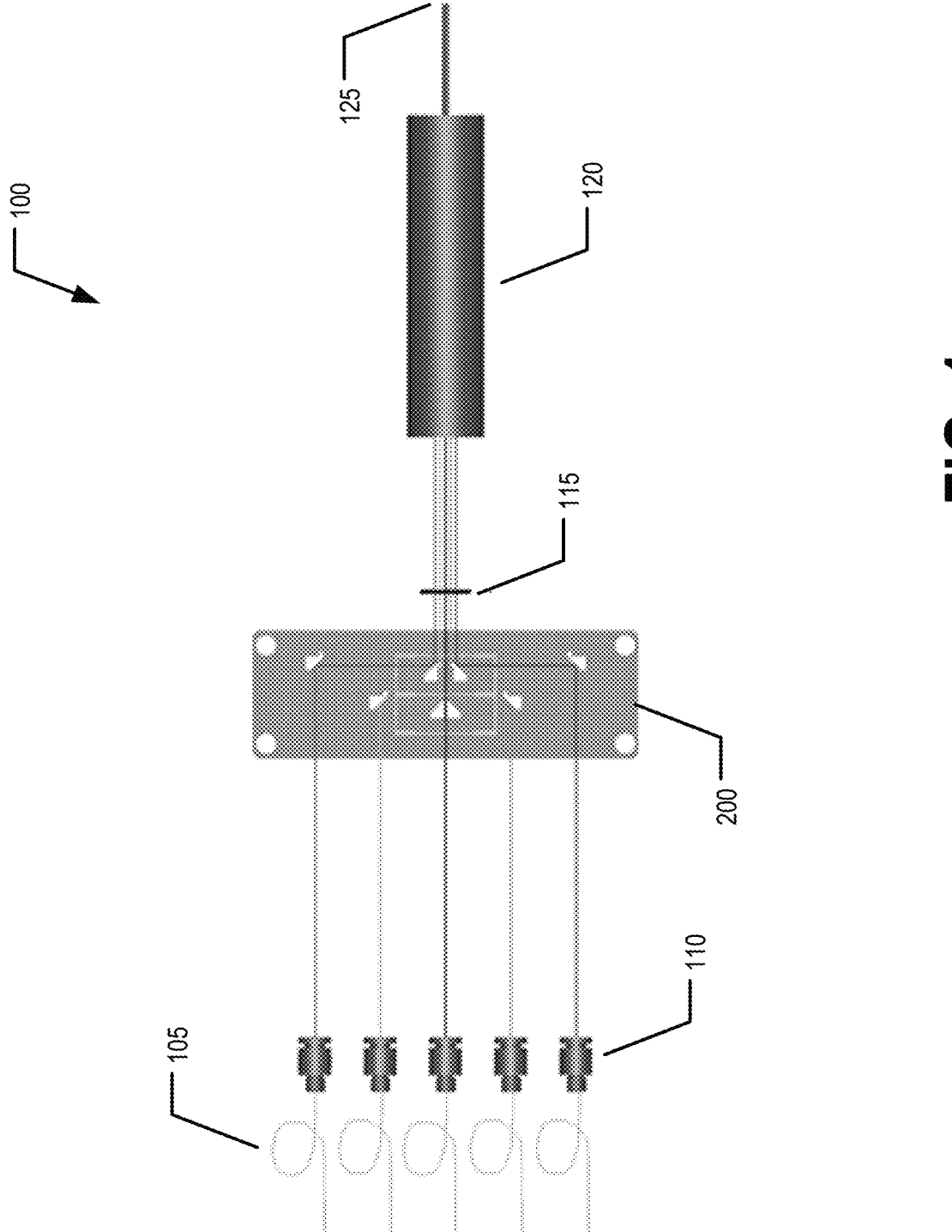

beams and the incoming array of beams have a different spatial frequencies.

18 Claims, 6 Drawing Sheets

(56) References Cited

U.S. PATENT DOCUMENTS

| | | | | | |
|---|---|---|---|---|---|
| 6,738,583 | B1 * | 5/2004 | Matta | ..................... | H04B 10/11 |
| | | | | | 398/131 |
| 7,023,620 | B1 * | 4/2006 | Sandberg | ............. | G02B 27/126 |
| | | | | | 359/638 |
| 2014/0217073 | A1 | 8/2014 | Armbruster et al. | | |

FOREIGN PATENT DOCUMENTS

| | | |
|---|---|---|
| DE | 19710825 A1 | 9/1998 |
| JP | 2003-332235 A | 11/2003 |
| JP | 2006-337594 A | 12/2006 |
| JP | 2019-525183 A | 9/2019 |
| WO | 2015/072478 A1 | 5/2015 |
| WO | 2015/145608 A1 | 10/2015 |
| WO | 2018/045732 A1 | 3/2018 |

OTHER PUBLICATIONS

Outgoing—ISA/210—International Search Report Mailed on Oct. 31, 2023 for WO Application No. PCT/US23/027739, 7 page(s).

Outgoing Written Opinion of the ISA Mailed on Oct. 31, 2023 for WO Application No. PCT/US23/027739, 10 page(s).

English Translation of JP Office Action, including search report, dated Mar. 24, 2026 for JP Application No. 2025501857, 3 page(s).

JP Office Action, including Search Report Mailed on Mar. 24, 2026 for JP Application No. 2025501857, 15 page(s).

Nemoto, Koshichi, et al., "Laser beam-forming by deformable mirror", Proceedings SPIE 2119, Intense Beams and Applications: Lasers, Ions, and Microwave, Jun. 1, 1994, 7 pages, Los Angeles, CA.

* cited by examiner

SPATIAL PERIOD CONVERTER WITH MONOLITHIC ZOOM

CROSS-REFERENCE TO RELATED APPLICATIONS

This application claims priority to U.S. Application No. 63/368,531, filed Jul. 15, 2022, the content of which is incorporated herein by reference in its entirety.

TECHNICAL FIELD

Various embodiments relate to an optical beam delivery system, such as a laser beam delivery system, for example. Various embodiments relate to a laser beam delivery system for delivering an array of parallel laser beams to respective target locations.

BACKGROUND

In various atomic systems, it is important to be able to deliver laser beams to dense one-or-more dimensional arrays of atomic systems at precision spacings and/or spacings. For example, trapped ion quantum computing uses laser beams to complete various functions within the trapped ion quantum computer. Such applications require that the lasers are delivered to the ion trap precisely and accurately in terms of position and spacings.

BRIEF SUMMARY OF EXAMPLE EMBODIMENTS

Example embodiments provide a beam delivery system for use in quantum computing applications, for example. Various embodiments provide a beam delivery system comprising a spatial period converter. In various embodiments, the spatial period converter is configured to adjust the spatial period of an array of optical beams (e.g., laser beams). In various embodiments, the spacing of nearest neighbor optical beams in the outgoing array of optical beams is uniform and in a range of 1.5 to 3 mm.

According to one aspect, an optical beam spatial period converter is provided. The converter comprises a substrate comprising two or more flexures coupled in series; and a plurality of reflective elements disposed on a surface of the substrate. The plurality of reflective elements comprises a plurality of first spacing reflective elements and a plurality of second spacing reflective elements. Each first spacing reflective element of the plurality of first spacing reflecting elements is configured to receive a respective incoming optical beam of an incoming array of optical beams and redirect the respective incoming optical beam to provide an intermediate optical beam to a respective second spacing reflective element. Each second spacing reflective element of the plurality of second spacing reflective elements is configured to receive a respective intermediate optical beam and redirect the respective intermediate optical beam to provide a respective outgoing optical beam. The respective outgoing optical beam is one of plurality of outgoing optical beams that form an outgoing array of optical beams. The outgoing array of optical beams has a different spatial period from the incoming array of optical beams.

In an example embodiment, a spacing between nearest neighbor respective outgoing optical beams of the outgoing array of optical beams is uniform.

In an example embodiment, the spacing is adjustable by application of a translating force to a first flexure of the two or more flexures.

In an example embodiment, the two or more flexures are coupled in series such that when a translating force is a applied to a first flexure of the two or more flexures, each of the two or more flexures are moved concertedly.

In an example embodiment, the optical beam spatial period converter further comprises an actuator configured to apply a force to a first edge of a first flexure of the two or more flexures such that the first flexure moves a first distance and a second flexure of the two or more flexures move a second distance, the second distance being half of the first distance.

In an example embodiment, the actuator comprises a piezoelectric component and the piezoelectric component is configured to cause a length of the actuator to be adjustable.

In an example embodiment, the actuator is disposed within a cavity located within the substrate.

In an example embodiment, a wall of the cavity disposed at the first edge of the first flexure comprises a conical seat and the actuator is configured to engage the conical seat.

In an example embodiment, the movement of a second flexure of the two or more flexures is controlled by the movement of the first flexure.

In an example embodiment, the plurality of reflective optical elements comprise at least one of mirrors or reflecting prisms.

In an example embodiment, the two or more flexures are formed by machining slots into the substrate.

According to another aspect, a beam delivery system for providing a plurality of parallel optical beams is provided. In an example embodiment, the beam delivery system comprises an array of objective lenses defining an intermediate focal plane; and an optical beam spatial period converter. The optical beam spatial period converter comprises a substrate; and a plurality of reflective elements disposed on a surface of the substrate. The plurality of reflective elements comprises a plurality of first spacing reflective elements and a plurality of second spacing reflective elements. Each first spacing reflective element of the plurality of first spacing reflecting elements is configured to receive a respective incoming optical beam of an incoming array of optical beams and redirect the respective incoming optical beam to provide an intermediate optical beam to a respective second spacing reflective element. Each second spacing reflective element of the plurality of second spacing reflective elements is configured to receive a respective intermediate optical beam and redirect the respective intermediate optical beam to provide a respective outgoing optical beam. The respective outgoing optical beam is one of plurality of outgoing optical beams that form an outgoing array of optical beams. The outgoing array of optical beams has a different spatial period from the incoming array of optical beams.

In an example embodiment, a spacing between nearest neighbor respective outgoing optical beams of the outgoing array of optical beams is uniform.

In an example embodiment, the substrate comprises two or more flexures that are coupled to one another in series.

In an example embodiment, the spacing is adjustable by application of a translating force to a first flexure of the two or more flexures.

In an example embodiment, the optical beam spatial period converter further comprises an actuator configured to apply a force to a first edge of a first flexure of the two or more flexures such that the first flexure moves a first distance and a second flexure of the two or more flexures moves a second distance, the second distance being half of the first distance.

In an example embodiment, the actuator comprises a piezoelectric component and the piezoelectric component is configured to cause a length of the actuator to be adjustable.

In an example embodiment, the actuator is disposed within a cavity located within the substrate.

In an example embodiment, movement of a second flexure of the two or more flexures is controlled by movement of the first flexure.

In an example embodiment, the beam delivery system further comprises a relay lens, wherein respective incoming optical beams of the incoming array of optical beams pass through respective objective lenses of the array of objective lenses before being incident on respective ones of the plurality of first spacing reflective elements, and the outgoing array of optical beams passes through the relay lens.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a schematic diagram of at least a portion of an example optical beam delivery system, in accordance with an example embodiment.

Figures 2, 2A:
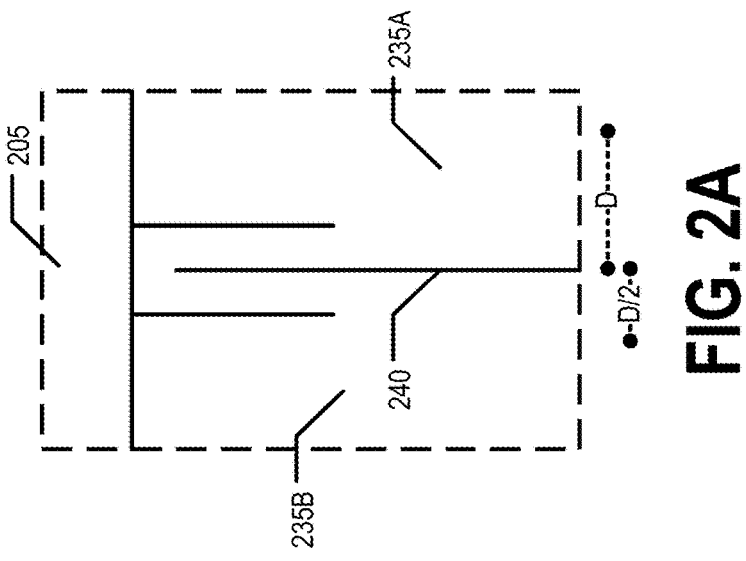

FIG. 2 provides a top view of an example optical beam spatial period converter, in accordance with an example embodiment.

FIG. 2A provides a close up view of a portion of the optical beam spatial period converter indicated by box A in FIG. 2, in accordance with an example embodiment.

Figure 3:
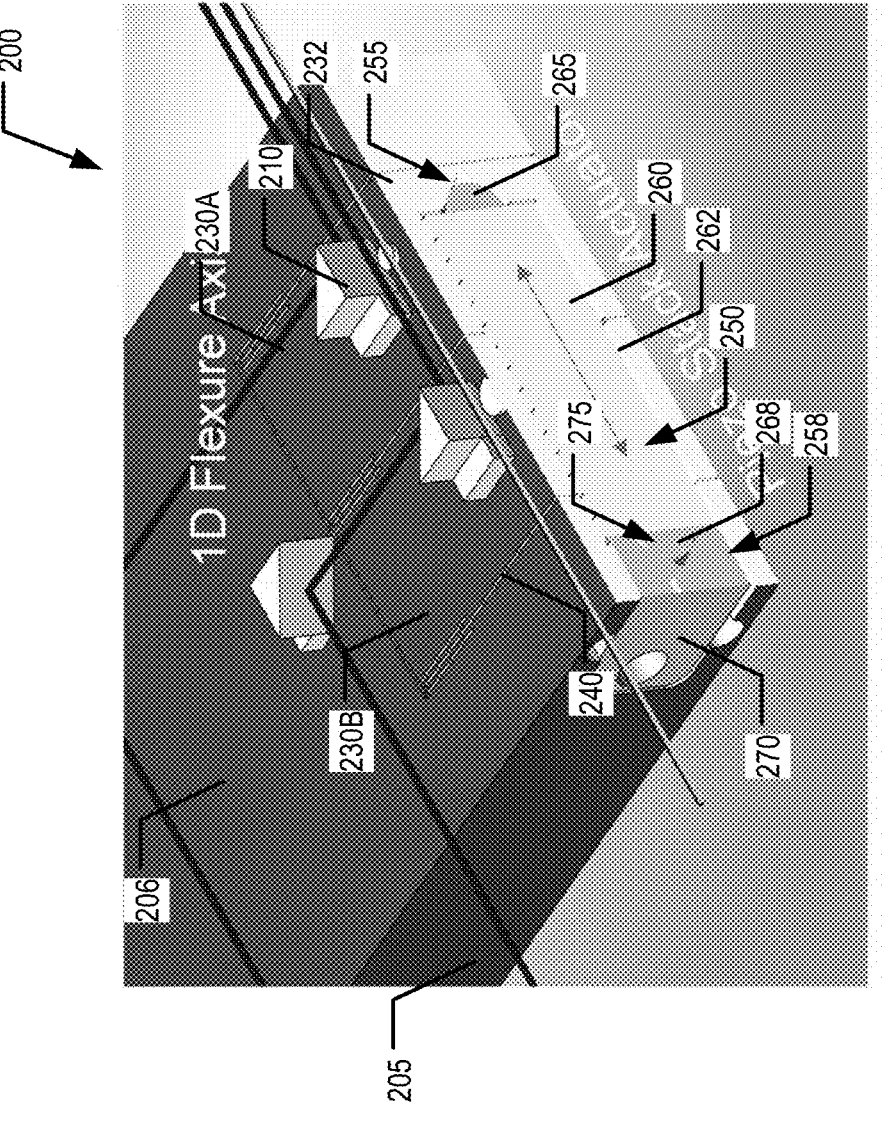

FIG. 3 provides a cross-sectional diagram of an example optical beam spatial converter taken along a plane substantially parallel to the direction of propagation of the optical beam delivery system, in accordance with an example embodiment.

Figure 4:
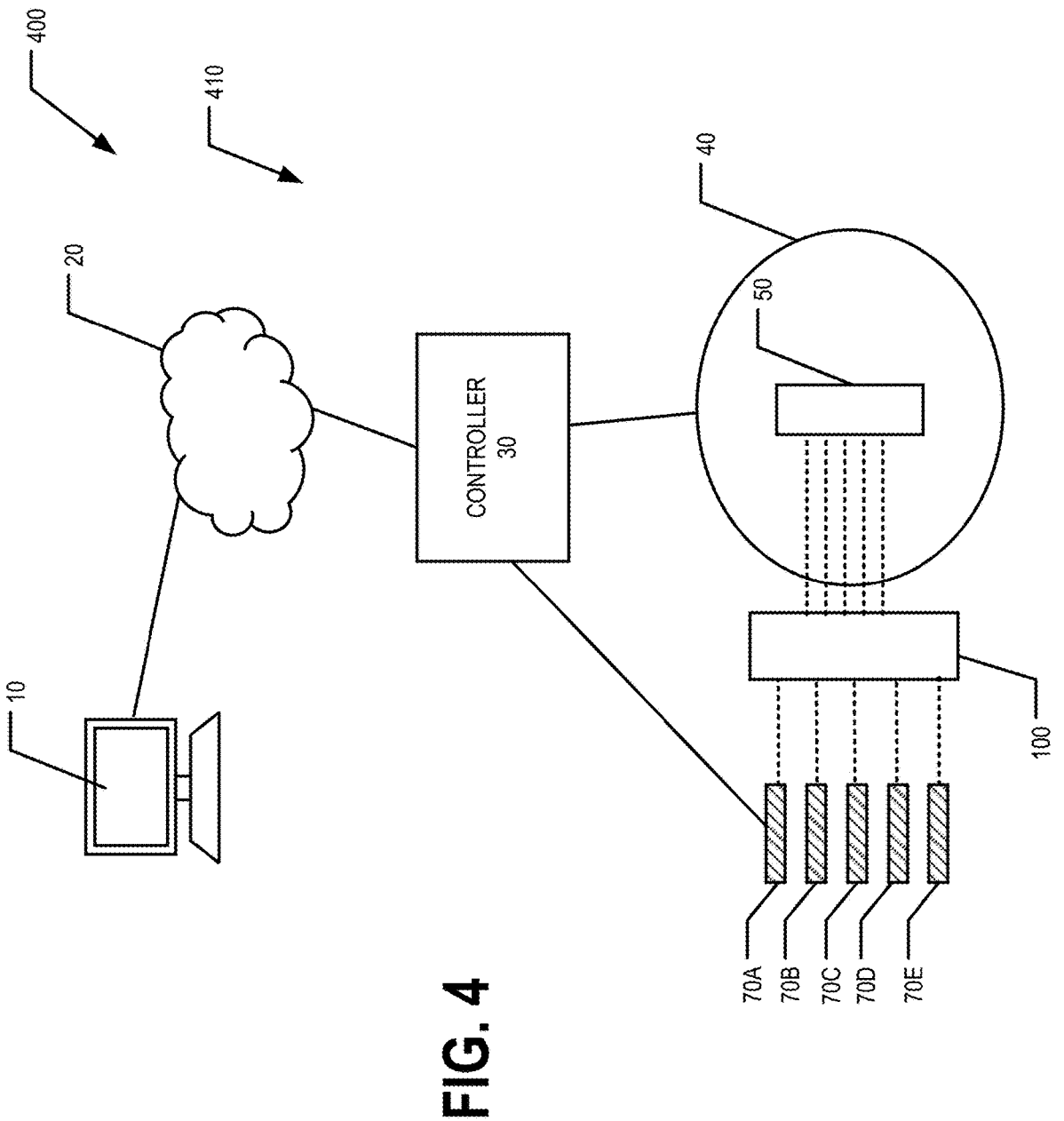

FIG. 4 provides a block diagram of an example quantum computer incorporating an example optical beam spatial period converter, in accordance with an example embodiment.

Figure 5:
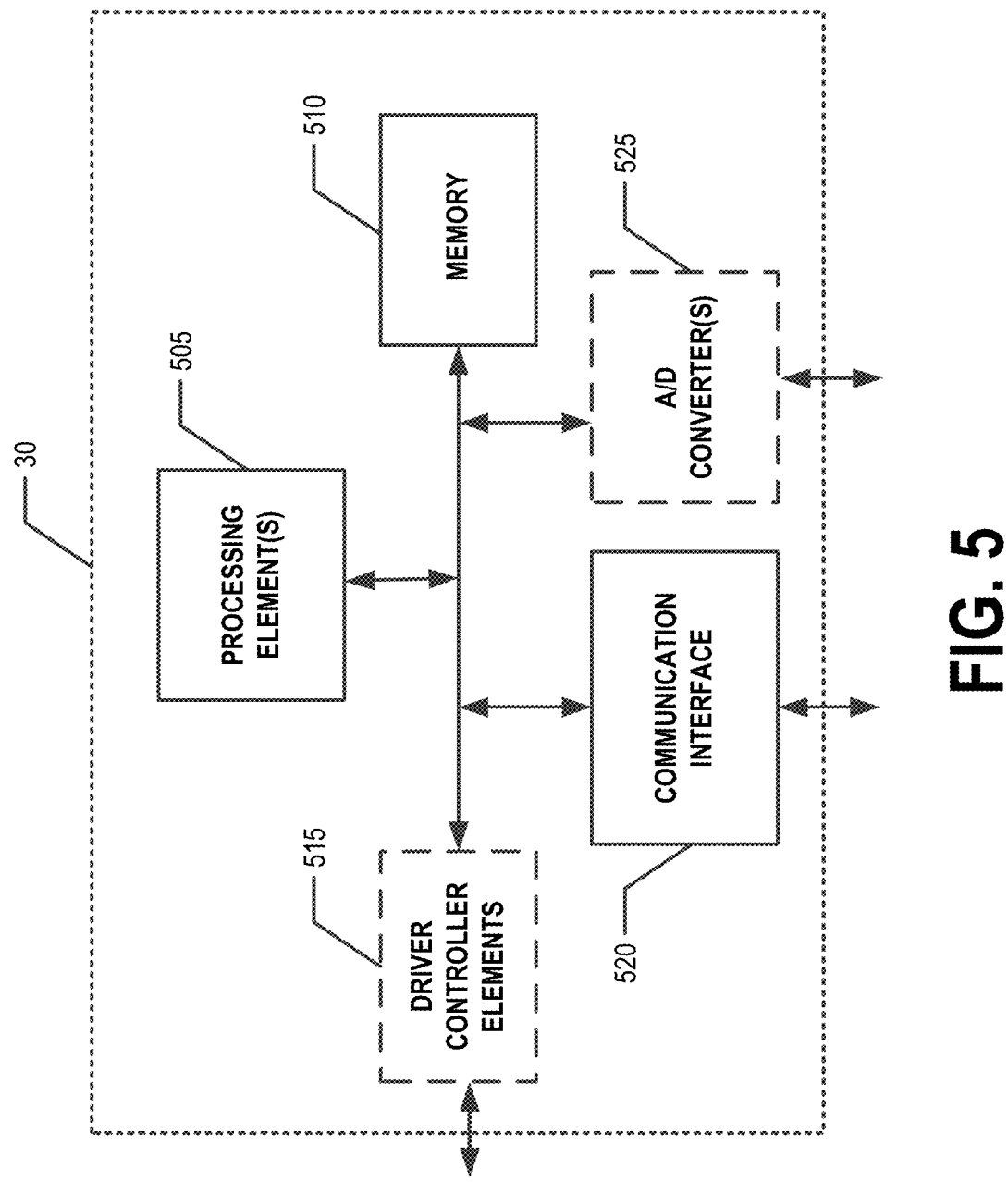

FIG. 5 provides a block diagram of an example controller of a quantum computer, in accordance with an example embodiment.

Figure 6:
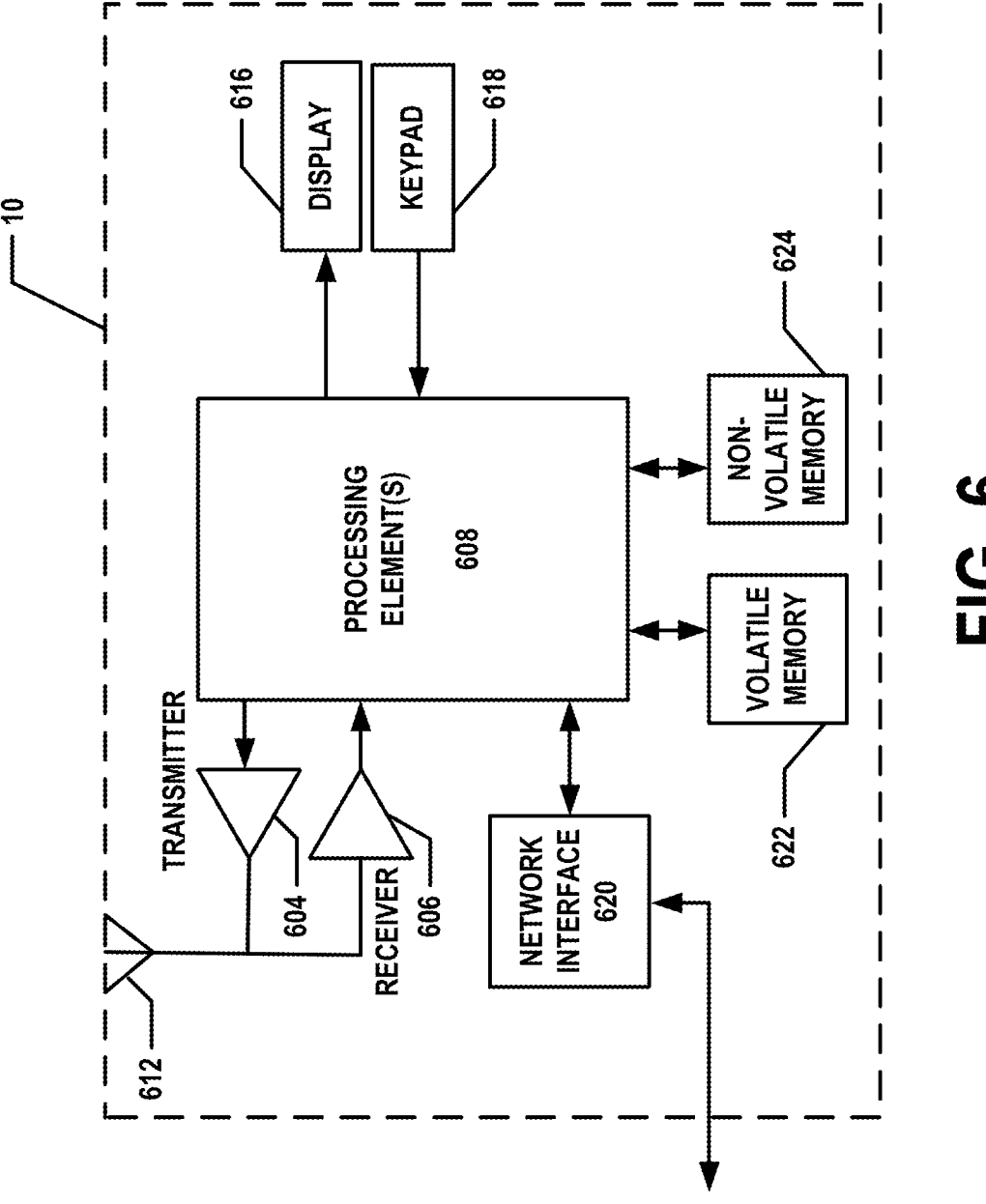

FIG. 6 provides a block diagram of an example computing entity, in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

As described above, in various atomic systems, it is important to be able to precisely and accurately, in terms of position and/or spacings, deliver one or more optical beams (e.g., laser beams) to the atomic system. For example, in atomic systems such as atomic clocks, Bose-Einstein condensate systems, trapped ion systems, and/or other atomic systems, precise and accurate optical beam delivery is important for various uses of the system, manipulating the system, and/or the like.

In various embodiments, an optical beam delivery system is provided for providing a plurality of optical beams with precise and accurate positioning and/or spacing. In an example embodiment, the optical beam delivery system is configured for providing a plurality of parallel optical beams.

In various embodiments, the optical beam delivery system comprises an optical beam spatial period converter. In various embodiments, the optical beam spatial period converter is configured to receive an array of incoming optical beams characterized by a first spacing and provide an array of outgoing optical beams characterized by a second spacing where the first spacing and the second spacing are different. For example, the optical beam spatial period converter is configured to convert the spatial period and/or beam spacing of the array of incoming optical beams into the spatial period and/or beam spacing of the array out going optical beams. In various embodiments, the spacing of the beams in the array of outgoing optical beams may be smaller or larger than the spacing of the beams in the array of incoming optical beams, as appropriate for the application.

In various embodiments, the optical beam spatial period converter comprises two or more flexures that are coupled to each other in series. The two or more flexures are coupled to one another such that movement of a first flexure of the two or more flexures causes movement of the remainder of the flexures of the two or more flexures. In various embodiments, movement of a first flexure of the two or more flexures causes movement of the remainder of the flexures of the two or more flexures such that the spacing of the outgoing array of optical beams is uniform. Various embodiments will now be described with more detail.

Example Beam Delivery System

FIG. 1 illustrates an example beam delivery system 100 in accordance with an example embodiment. In the illustrated embodiment, the beam delivery system 100 comprises an array of optical fibers 105. The array of optical fibers comprises a plurality of optical fibers. Each optical fiber provides an optical beam generated and/or provided by a manipulation source (e.g., comprising a laser or other optical source). The physical size of the objective lenses and optical fibers of the array of optical fibers 105 and/or ferrules, fiber blocks, v-grooves, and/or the like used to secure the optical fibers into respective positions limits how small the spacing between adjacent and/or nearest neighbor beams is able to be without the use of an optical beam spatial period converter.

Each of the optical fibers of the array of optical fibers 105 is configured to provide a respective optical beam to a respective object lens of the plurality of objective lenses. For example, each optical fiber of the array of optical fibers 105 provides an optical beam. The plurality of optical beams provided by the optical fibers of the array of optical fibers 105 forms the incoming array of optical beams.

The beam delivery system further comprises an array of objective lenses 110 comprising a plurality of objective lenses. Each objective lens is configured to receive a respective optical beam (e.g., provided by a respective optical fiber) and focus the respective optical beam at the intermediate focus plane 115. In various embodiments the array of objective lenses 110 defines the intermediate focus plane 115.

In various embodiments, the beam delivery system further comprises a relay lens 120. In various embodiments, the relay lens 120 is configured to receive the optical beams after they have been focused at the intermediate focus plane 115. In various embodiments, the relay lens 120 may invert the incoming array of optical beams, magnify or demagnify the incoming array of optical beams, and/or the like. In an example embodiment, the relay lens 120 is configured to receive the outgoing array of optical beams provided as the output of the optical beam spatial period converter 200.

In various embodiments, the beam delivery system further comprises an optical beam spatial period converter 200. In an example embodiment, the optical beam spatial period converter 200 is disposed between the array of objective lenses 110 and the relay lens 120. For example, the optical beam spatial period converter 200 is located at the intermediate focus plane 115, between the array of objective lenses 110 and the intermediate focus plane 115, or between the intermediate focus plane and the relay lens 120, in various embodiments.

The optical beam spatial period converter 200 is configured to change the spacing of the array of optical beams. For example, the incoming array of optical beams exiting the array of objective lenses 110 is characterized by a first nearest neighbor spacing. The optical beam spatial period converter 200 modifies the incoming array of optical beams to provide an outgoing array of optical beams that is characterized by a second nearest neighbor spacing. The first nearest neighbor spacing and the second nearest neighbor spacing are different. In various embodiments, the second nearest neighbor spacing is less than the first nearest neighbor spacing. In other words, the outgoing array of optical beams is more dense or tightly packed (e.g., with smaller spacing between nearest neighbor optical beams) than the incoming array of optical beams. In an example embodiment, the nearest neighbor spacing of the outgoing array of optical beams is in the range of 1.5 to 5 mm. In an example embodiment, the nearest neighbor spacing of the outgoing array of optical beams is in the range of 1.5 to 3 mm.

In various embodiments, the outgoing array of optical beams is provided to an interaction plane 125. The respective optical beams of the outgoing array of optical beams are configured to interact with respective atomic objects at the interaction plane 125. For example, the respective optical beams of the outgoing array of optical beams may be used to perform multiple operations of an atomic system in parallel. In an example embodiment, the atomic system is disposed within a cryo and/or vacuum chamber and the outgoing array of optical beams passes through a window into the interior of the cryo and/or vacuum chamber to interact with atomic objects of the atomic system.

Example Optical Beam Spatial Period Converter

In various embodiments, a beam delivery system comprises one or more optical beam spatial period converters 200. FIG. 2 illustrates an example embodiment of an optical beam spatial period converters 200. In various embodiments, an optical beam spatial period converter 200 is configured to change the spatial periodicity or frequency of optical beams in an array of optical beams. In various embodiments, the optical beam spatial period converter 200 comprises a substrate 205 and a plurality of reflective elements 210 (e.g., 210A-H) disposed and/or secured on a surface 206 of the substrate 205.

In various embodiments, the substrate 205 is a plate made of aluminum, stainless steel, titanium, and/or the like. In an example embodiment, the substrate 205 is a semiconductor wafer. In various embodiments, the substrate 205 is made of a material with appropriate rigidity and machinability characteristics, as appropriate for the application.

In various embodiments, the plurality of reflective elements 210 comprise a plurality of first spacing reflective elements 210A, 210B, 210C, 210D and a plurality of second spacing reflective elements 210E, 210F, 210G, 210H. Each first spacing reflective element of the plurality of first spacing reflecting elements (210A, 210B, 210C, 210D) is configured to receive a respective incoming optical beam of an incoming array of optical beams 272 and redirect the respective incoming optical beam to provide an intermediate optical beam to a respective second spacing reflective element (210E, 210F, 210G, 210H). Each second spacing reflective element of the plurality of second spacing reflective elements is configured to receive a respective intermediate optical beam and redirect the respective intermediate optical beam to provide a respective outgoing optical beam. The respective outgoing optical beam is one of plurality of outgoing optical beams that form an outgoing array of optical beams 274.

The incoming array of optical beams 272 is characterized by a first spacing a. As illustrated, the first spacing a is the distance between (spatially) nearest neighbor optical beams of the incoming array of optical beams. The outgoing array of optical beams 274 is characterized by a second spacing b. As illustrated, the second spacing b is the distance between (spatially) nearest neighbor optical beams of the outgoing array of optical beams. In the illustrated embodiment, the second spacing b is significantly less than the first spacing a (e.g., b<a). In an example embodiment, a is approximately 20 mm and b is in the range of 1.5 to 3 mm (e.g., approximately 2 mm). In an example embodiment, the second spacing b is larger than 3 mm.

In various embodiments, the optical beams of the incoming array of optical beams are propagating in respective propagation directions that are substantially parallel to the optical axis 280 of the optical beam spatial period converter 200. In various embodiments, the optical beams of the outgoing array of optical beams are propagating in respective propagation directions that are substantially parallel to the optical axis 280 of the optical beam spatial period converter 200. In various embodiments, the intermediate optical beams propagate in a direction that is transverse and/or substantially perpendicular to the optical axis 280 of the optical beam spatial period converter 200.

In various embodiments, the optical beam spatial period converter 200 comprises a substrate 205 and a plurality of reflective elements 210 (e.g., 210A-H) disposed and/or secured on a surface 206 of the substrate 205. In various embodiments, the reflective elements 210 of the plurality of reflective elements comprise mirrors, external reflective prisms, total internal reflection prisms, and/or the like. In an example embodiment, the reflective elements 210 are reflective prisms configured to perform external reflections of respective optical beams. In an example embodiment, the reflective elements 210 are reflective prisms configured to perform internal reflections of respective optical beams. In an example embodiment, the reflective prisms are formed to be 45-45-90 degree triangular prisms (e.g., to have a cross-section that is a triangle having internal angles of 45 degrees, 45 degrees, and 90 degrees). In an example embodiment, the angles of the cross-sectional shape of the reflective prisms have a tolerance of a few arc-seconds.

In various embodiments, steps 215 and pins 220 are machined into the surface 206 or secured to the surface 206 of the substrate and configured to be used for positioning and retaining the respective reflective elements 210 in the appropriate positions. In an example embodiment, the shape of the reflective elements 210 and the layout of the steps 215 and the pins 220 enable proper alignment of a respective reflective elements 210 through engagement of the reflective element 210 with a step 215 and pin 220 pair.

In an example embodiment, each optical beam of the incoming array of optical beams 272 is in a same plane (substantially parallel to the optical axis 280). In an example embodiment, the optical beams of the incoming array of optical beams 272 are not coplanar.

In an example embodiment, each optical beam of the outgoing array of optical beams 274 is in a same plane (substantially parallel to the optical axis 280). In an example embodiment, the optical beams of the outgoing array of optical beams 274 are not coplanar.

In an example embodiment, each optical beam of the incoming array of optical beams 272 and each optical beam of the outgoing array of optical beams 274 are characterized by a same wavelength and a same beam size (e.g., beam waist, cross-section profile, and/or the like). In an example embodiment, one or more of the optical beams of the incoming array of optical beams 272 and/or one or more optical beams of the outgoing array of optical beams 274 is characterized by a wavelength and/or beam size (e.g., beam waist, cross-section profile, and/or the like) that differs from at least one other optical beam of the incoming array of optical beams 272 and/or at least one other optical beam of the outgoing array of optical beams 274.

In various embodiments, the substrate 205 comprises flexures 230 (230A, 230B). The flexures 230 are coupled to one another in series. In various embodiments, the flexures 230 are coupled to one another in a direction that is substantially parallel to the optical axis 280.

In various embodiments, the flexures 230 are formed by etching and/or machining the substrate 205 to form slots 240 therethrough. In various embodiments, the slots 240 are etched and/or machined through the entire thickness of the substrate 205 (where the thickness is measured perpendicular to the surface 206). For example, the slots 240 may be etched and/or machined through the substrate 205 using wire electric discharge machining (EDM) and/or another machining technique.

In various embodiments, the slots 240 define flexure islands 235 (e.g., 235A, 235B). The flexure islands 235 are still connected to the substrate 205, but are able to move within a defined range in a direction substantially parallel to the optical axis 280 of the optical beam spatial period converter 200. In various embodiments, the defined range is defined by the substrate 205.

The flexure islands 235 are coupled to one another. FIG. 2A provides a close-up view of the portion of the optical beam spatial period converter 200 shown in box A in FIG. 2 and illustrates the mechanical coupling of the first flexure island 235A and the second flexure island 235B.

The mechanical coupling of the first flexure island 235A and the second flexure island 235B results in the second flexure 230B being coupled to the first flexure 230A in series such that when a translating force is a applied to a first flexure 230A (e.g., in a direction substantially parallel to the optical axis 280), the first flexure 230A and the second flexure 230B are moved concertedly. For example, movement of the second flexure 230B may be controlled by the movement of the first flexure 230A.

In an example embodiment, when a force is applied to the first flexure 230A in a direction substantially parallel to the optical axis 280, the first flexure island 235A moves a distance D in the direction of the optical axis 280 and the second flexure island 235B moves a distance D/2 in the direction of the optical axis 280. If a third flexure island was coupled to the second flexure island 235B, the first flexure island would move a distance D in the direction of the optical axis 280, the second flexure island would move a distance 2D/3 in the direction of the optical axis 280, and the third flexure island would move a distance D/3 in the direction of the optical axis 280. In general, for an ith flexure island in a series of N flexure islands coupled in series, the ith flexure island will move a distance $i*D/N$ in the direction of the optical axis 280, when the first flexure island move a distance D in the direction of the optical axis 280.

In various embodiments, the plurality of second spacing reflective elements (210E, 210F, 210G, 210H) are disposed on the flexure islands 235. For example, each of the plurality of second spacing reflective elements is aligned with a respective one of the plurality of first spacing reflective elements such that the respective second spacing reflective element receives an intermediate beam that interacted with the respective first spacing reflective element. For example, first spacing reflective element 210A redirects a first incoming optical beam to provide a first intermediate optical beam which then interacts with second spacing reflective element 210F to provide a first outgoing optical beam.

As the second spacing reflective element 210F is disposed on the first flexure island 235A, the second spacing reflective element 210F may be moved or translated in the direction of the optical axis 280. The movement of the second spacing reflective element 210F controls where along the angled face of the second spacing reflective element 210F the first intermediate optical beam interacts. Thus, movement of the first flexure island 235A controls the position of the first outgoing optical beam within the array of outgoing optical beams.

As noted above, when the first flexure island 235A moves a distance D in the direction of the optical axis 280 and the second flexure island 235B moves a distance D/2 in the direction of the optical axis 280. Thus, when the second spacing reflective elements 210F and 210H disposed on the first flexure island 235A move a distance D, the second spacing reflective elements 210E and 210G disposed on the second flexure island 235B move a distance D/2. This enables the second spacing b of the array of outgoing optical beams to remain uniform (e.g., the distance between nearest neighbor optical beams in the array of optical beams is the same for each of the outgoing optical beams).

FIG. 3 illustrates a perspective view of a cross-section of the optical beam spatial period converter 200 where the cross-section is taken in a plane perpendicular to the surface 206 of the substrate 205. As shown in FIG. 3, the substrate 205 comprises a cavity 250. In an example embodiment, the cavity 250 is at least partially disposed within the flexure islands 235. For example, in the illustrated embodiment, the cavity 250 comprises a seat 255 disposed at a first edge 232 of the first flexure 230A. In an example embodiment, the seat 255 is configured to be engaged by an actuator 260 disposed within the cavity 250. In an example embodiment, the seat 255 is a conical seat (e.g., substantially conical in shape).

In an example embodiment, a first end of the cavity comprises the seat 255 and the second end of the cavity comprises an opening 258. In various embodiments, the opening 258 is configured to enable the actuator 260 to be positioned into the cavity 250. In an example embodiment, the opening 258 is at least partially filled and/or closed by end plate 270. In various embodiments, the end plate 270 comprises a seat 275 configured to be engaged by the actuator 260. The end plate 270 may be configured to be secured into the opening 258 (e.g., using one more mechanical fasteners such as screws and/or the like) such that pressure applied to the end plate 270 by the actuator 260 does not cause the end plate 270 to be moved with respect to the substrate 205. In an example embodiment, the end plate 270 may comprise one or more access holes that allow one or more wires to pass therethrough. For example, the actuator 260 is controlled via electrical signals through one or more wires (not shown) that pass through an access hole of the end plate 270.

In various embodiments, the actuator 260 comprises a shaft portion 262 and two end caps 265, 268. In an example embodiment, each end cap 265, 268 is configured to engage with a respective seat 255, 275. For example, first end cap 265 is configured to interact and/or engage with the seat 255 disposed at and/or proximate the first edge 232 of the first flexure 230A and the second end cap 268 is configured to interact with the seat 275 that is formed by part of the end plate 270. In various embodiments, the length of the shaft portion 262 may be changed such that the end caps 265, 268 are caused to engage with their respective seats 255, 275 such that a translation force is selectively applied to the first flexure 230A through the action of the actuator 260.

For example, in an example embodiment, the actuator 260 is configured to apply a force to a first edge 232 of a first flexure 230A of the two or more flexures such that the first flexure 230A moves a first distance and a second flexure 230B of the two or more flexures move a second distance, the second distance being half of the first distance. For example, in an example embodiment, the length of the actuator 260 is adjustable so as to be able to apply a force to a first edge 232 of a first flexure 230A of the two or more flexures such that the first flexure 230A moves a first distance and a second flexure 230B of the two or more flexures move a second distance, the second distance being half of the first distance.

In an example embodiment, the actuator 260 comprises a piezoelectric component. For example, in an example embodiment, the shaft portion 262 of the actuator 260 comprises a piezoelectric material. Thus, the length of the shaft portion 262 (measured in a direction substantially parallel to the optical axis 280) may be adjusted (e.g., shorted and/or lengthened) by applying an electric signal to the shaft portion.

In an example embodiment, the end caps 265, 268 are made of a different material than the shaft portion 262. For example, the end caps 265, 268 are made of aluminum, stainless steel, titanium, ceramic material, or other rigid material that enables the end caps 265, 268 to engage with their respective seats 255, 275 in a manner that enables the actuator 260 to provide a predictable and/or consistent force to the first edge 232 of the first flexure 230A.

Example Quantum Computer System

One example atomic system in which an embodiment of a beam delivery system may be incorporated and/or implemented is a trapped atomic object quantum computer. FIG. 4 provides a schematic diagram of an example trapped atomic object quantum computer system 400, in accordance with an example embodiment. In various embodiments, the trapped atomic object quantum computer system uses atomic objects as qubits of a quantum computer. In various embodiments, the atomic objects are ions, atoms, groups or crystals of ions or atoms, molecules, and/or the like.

In various embodiments, the quantum computer system 400 comprises a computing entity 10 and a quantum computer 410. In various embodiments, a controller 30 of the quantum computer 410 may be in communication with the computing entity 10 via one or more wired and/or wireless networks 20. In various embodiments, the quantum computer 410 comprises the controller 30, a cryo and/or vacuum chamber 40 enclosing an atomic object confinement apparatus 50 (e.g., an ion trap and/or the like), one or more manipulation sources 70 (e.g., 70A, 70B, 70C, 70D, 70E), and/or the like.

In various embodiments, the atomic object confinement apparatus 50 is a confinement apparatus configured to atomic object confinement apparatus one or more atomic objects therein and the manipulation sources are configured to provide manipulation signals to one or more portions of the atomic object confinement apparatus 50 via optical paths. In various embodiments. In various embodiments, the manipulation signals may be used to initialize one or more atomic objects into a qubit space, perform cooling operations, perform measurement operations, provide one or more gate signals, and/or the like. In various embodiments, the manipulation sources 70 comprise one or more laser systems configured to provide one or more manipulation signals (e.g., laser beams used as gate signals, for example) to one or more portions of the atomic object confinement apparatus 50 to enact one or more quantum gates (e.g., quantum logic gates). In various embodiments, the quantum gates may be one qubit gates, two qubit gates, and/or the like. In various embodiments, the one or more gate signals may be provided to the one or more portions of the atomic object confinement apparatus 50 via optical path(s), which may include and/or be defined at least in part by a beam delivery system 100 comprising one or more optical beam spatial period converters 200. In various embodiments, the atomic objects confined or trapped within the atomic object confinement apparatus 50 are ions, atoms, and/or the like. For example, in an example embodiment, an atomic object is an ytterbium ion or a barium ion. In an example embodiment, an atomic object comprises a qubit ion and a corresponding cooling ion.

In various embodiments, a computing entity 10 is configured to allow a user to provide input to the quantum computer system 400 (e.g., via a user interface of the computing entity 10) and receive, view, and/or the like output from the quantum computer system 400. The computing entity 10 may be in communication with the controller 30 via one or more wired or wireless networks 20. For example, the computing entity 10 may be configured to provide quantum circuits to the controller 30 for execution by the quantum computer 410 and the controller 30 may provide the results of executing one or more quantum circuits to the computing entity 10.

In various embodiments, the controller 30 is configured to control the atomic object confinement apparatus 50, cooling and/or vacuum systems (not shown) controlling the temperature and pressure within the cryo and/or vacuum chamber 40, manipulation sources 70 (e.g., laser systems), servo, and/or other components of the quantum computer 410 (e.g., an optical collection system configured for "reading" the output of the quantum computer). In various embodiments, the controller 30 is configured to control various components of the quantum computer 410 in accordance with executable instructions, command sets, and/or the like provided by the computing entity 10 and/or generated by the controller 30. In various embodiments, the controller 30 is configured to receive output from the quantum computer 410 (e.g., from an optical collection system) and provide the output and/or the result of processing the output to the computing entity 10.

Example Controller

In various embodiments, a quantum computer 410 comprises a controller 30 configured to control various elements of the quantum computer 410. In various embodiments, a controller 30 may be configured to cause a quantum computer 410 to perform various operations (e.g., computing operations such as gate operations, cooling operations, transport operations, qubit interaction operations, qubit measurement operations, leakage suppression operations, and/or the like). For example, the controller 30 may be configured to cause manipulation sources to provide manipulation signals to atomic objects confined and/or trapped within the atomic object confinement apparatus 50. For example, the controller 30 may be configured to cause the manipulation sources 70 (e.g., laser systems) to provide one or more gate signals to one or more atomic objects confined and/or trapped within the atomic object confinement apparatus 50 so as to enact, for example, one or more quantum gates. In various embodiments, the controller 30 may be configured to control a cryogenic system and/or vacuum system controlling the temperature and pressure within the cryogenic and/or vacuum chamber 40, manipulation sources, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the atomic object confinement apparatus 50.

As shown in FIG. 5, in various embodiments, the controller 30 may comprise various controller elements including processing element(s) 505, memory 510, driver controller elements 515, a communication interface 520, analog-digital converter 525, and/or the like. For example, the processing element(s) 505 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like, and/or controllers. The term circuitry may refer to an entirely hardware embodiment or a combination of hardware and computer program products. In an example embodiment, the processing element(s) 505 of the controller 30 comprises a clock and/or is in communication with a clock.

For example, the memory 510 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FORAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 510 may store qubit records corresponding the qubits of quantum computer 410 (e.g., in a qubit record data store, qubit record database, qubit record table, and/or the like), a calibration table, an executable queue, computer program code (e.g., in a one or more computer languages, specialized controller language (s), and/or the like), and/or the like. In an example embodiment, execution of at least a portion of the computer program code stored in the memory 510 (e.g., by a processing element(s) 505) causes the controller 30 to perform one or more steps, operations, processes, procedures and/or the like described herein for tracking the phase of an atomic object within an atomic system and causing the adjustment of the phase of one or more manipulation sources and/or signal(s) generated thereby.

In various embodiments, the driver controller elements 515 may include one or more drivers and/or controller elements each configured to control one or more drivers. In various embodiments, the driver controller elements 515 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element(s) 505). In various embodiments, the driver controller elements 515 may enable the controller 30 to operate manipulation sources 70, control the actuator 260, operate vacuum and/or cryogenic systems, and/or the like. In various embodiments, the drivers may be laser drivers; microwave drivers; vacuum component drivers; cryogenic and/or vacuum system component drivers; current drivers and/or voltage sources; and/or the like. For example, the drivers and/or driver controllers may be configured to cause a magnetic field generation device (e.g., comprising circuitry coupled to a voltage source (e.g., a current driver or voltage driver), permanent magnet(s), and/or a combination thereof) to generate a magnetic field having a particular direction and magnitude at one or more positions of the atomic object confinement apparatus 50. In various embodiments, a plurality of positions of the atomic object confinement apparatus 50 (e.g., atomic object confinement apparatus zones) may be defined. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter element(s) 525 configured to receive signals from one or more optical receiver components, calibration sensors, and/or the like.

In various embodiments, the controller 30 may comprise a communication interface 520 for interfacing and/or communicating with a computing entity 10. For example, the controller 30 may comprise a communication interface 520 for receiving executable instructions, command sets, and/or the like from the computing entity 10 and providing output received from the quantum computer 410 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Example Computing Entity

FIG. 6 provides an illustrative schematic diagram of an example computing entity 10 that can be used in conjunction with embodiments of the present invention. In various embodiments, a computing entity 10 is configured to allow a user to provide input to the quantum computer 410 (e.g., via a user interface of the computing entity 10) and receive, display, analyze, and/or the like output from the quantum computer 410. For example, a user may operate a computing entity 10 to generate and/or program a quantum algorithm and/or quantum circuit that may be provided such that the controller 30 may receive the quantum algorithm and/or quantum circuit and cause the quantum computer 410 to perform the quantum algorithm and/or quantum circuit.

As shown in FIG. 6, a computing entity 10 can include an antenna 612, a transmitter 604 (e.g., radio), a receiver 606 (e.g., radio), and a processing element 608 that provides signals to and receives signals from the transmitter 604 and receiver 606, respectively, which may collectively be referred to a transceiver. The signals provided to and received from the transmitter 604 and the receiver 606, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 616 and/or speaker/speaker driver coupled to a processing element(s) 608 and a touch screen, keyboard, mouse, and/or microphone coupled to a processing element(s) 608). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 618 (hard or soft), a touch display, voice/speech or motion interfaces, scanners, readers, or other input device. In embodiments including a keypad 618, the keypad 618 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile memory or storage 622 and/or non-volatile memory or storage 624, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

Technical Advantages

Various embodiments provide technical solutions to the technical problem of precisely and accurately, in terms of position and/or spacing, delivering multiple optical beams (e.g., ultraviolet laser beams, visible laser beams, infrared laser beams, etc.) in a dense array (e.g., to a dense array of target locations). In various embodiments, the array of target locations comprises an array of atomic object confinement apparatus zones which may be a one- or two-dimensional array of zones within an atomic object confinement apparatus. The optical beam spatial period converter is configured to deliver the optical beams so that they are mutually parallel and correctly spaced to overlap with the atomic object confinement apparatus zones with submicron accuracy. Moreover, the optical beam spatial period converter is configured to provide the array of optical beams with a spacing that is significantly smaller than the spacing enabled by an array of optical fibers each with individual objective lenses.

Moreover, the alignment of the plurality of optical beams provided by a beam delivery system comprising an optical beam spatial period converter is simpler than traditional means and does not increase in complexity and/or in the number of degrees of freedom with an increase in the number of optical beams provided thereby. In particular, various embodiments provide an improvement over traditional means, which may be collections of individual fibers, collimators, and mirrors/lenses for each beam, but these systems required a large footprint on the breadboard and/or optical table. Further, these systems were limited in the degree to which they may scale by the amount of available space and ability to package the current laser-beam delivery apparatus.

Thus, various embodiments provide denser arrays of optical beams. Additionally, various embodiments provide the flexibility to adjust the spacing of the array of optical beams to enable accurate alignment of the array of optical beams to the array of target locations.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An optical beam spatial period converter, the converter comprising:
   a substrate comprising one or more flexure islands, wherein when the one or more flexure islands comprise two or more flexure islands, the two or more flexure islands are coupled to one another in series and a translational movement of a first flexure island of the two or more flexure islands is configured to cause a translational movement of a second flexure island of the two or more flexure islands; and
   a plurality of reflective elements disposed on a surface of the substrate,
   wherein the plurality of reflective elements comprises a plurality of first spacing reflective elements and a plurality of second spacing reflective elements, the plurality of second spacing reflective elements being disposed on the one or more flexure islands,
   each first spacing reflective element of the plurality of first spacing reflecting elements is configured to receive a respective incoming optical beam of an incoming array of optical beams and redirect the respective incoming optical beam to provide an intermediate optical beam to a respective second spacing reflective element, each second spacing reflective element of the plurality of second spacing reflective elements is configured to receive a respective intermediate optical beam and redirect the respective intermediate optical beam to provide a respective outgoing optical beam, wherein the respective outgoing optical beam is one of plurality of outgoing optical beams that form an outgoing array of optical beams, the outgoing array of optical beams having a different spatial period from the incoming array of optical beams.

2. The optical beam spatial period converter of claim 1, wherein a spacing between nearest neighbor respective outgoing optical beams of the outgoing array of optical beams is uniform.

3. The optical beam spatial period converter of claim 2, wherein the spacing is adjustable by application of a translating force to a first flexure island of the one or more flexure islands.

4. The optical beam spatial period converter of claim 1, further comprising an actuator configured to apply a force to a first edge of a first flexure island of the two or more flexure islands such that the first flexure island moves a first distance and a second flexure island of the two or more flexure islands moves a second distance, the second distance being a fraction of the first distance.

5. The optical beam spatial period converter of claim 4, wherein the actuator comprises a piezoelectric component and the piezoelectric component is configured to cause a length of the actuator to be adjustable.

6. The optical beam spatial period converter of claim 4, wherein the actuator is disposed within a cavity located within the substrate.

7. The optical beam spatial period converter of claim 6, wherein a wall of the cavity disposed at the first edge of the first flexure island comprises a conical seat and the actuator is configured to engage the conical seat.

8. The optical beam spatial period convertor of claim 4, wherein the movement of a second flexure island of the two or more flexure islands is controlled by the movement of the first flexure island.

9. The optical beam spatial period converter of claim 1, wherein the plurality of reflective optical elements comprise at least one of mirrors, externally reflecting prisms, or totally internal reflection prisms.

10. The optical beam spatial period converter of claim 1, wherein the one or more flexure islands are formed by machining slots into the substrate.

11. A system for providing a plurality of parallel optical beams, the system comprising:
   an array of objective lenses defining an intermediate focal plane; and
   an optical beam spatial period converter, the optical beam spatial period converter comprising:
   a substrate comprising one or more flexure islands, wherein when the one or more flexure islands comprise two or more flexure islands, the two or more flexure islands are coupled to one another in series and a translational movement of a first flexure island of the two or more flexure islands is configured to cause a translational movement of a second flexure island of the two or more flexure islands; and
   a plurality of reflective elements disposed on a surface of the substrate,
   wherein the plurality of reflective elements comprises a plurality of first spacing reflective elements and a plurality of second spacing reflective elements, the plurality of second spacing reflective elements being disposed on the one or more flexure islands, each first spacing reflective element of the plurality of first spacing reflecting elements is configured to receive a respective incoming optical beam of an incoming array of optical beams and redirect the respective incoming optical beam to provide an intermediate optical beam to a respective second spacing reflective element, each second spacing reflective element of the plurality of second spacing reflective elements is configured to receive a respective intermediate optical beam and redirect the respective intermediate optical beam to provide a respective outgoing optical beam, wherein the respective outgoing optical beam is one of plurality of outgoing optical beams that form an outgoing array of optical beams, the outgoing array of optical beams having a different spatial period from the incoming array of optical beams.

12. The system of claim 11, wherein a spacing between nearest neighbor respective outgoing optical beams of the outgoing array of optical beams is uniform.

13. The system of claim 11, wherein the spacing is adjustable by application of a translating force to a first flexure island of the two or more flexure islands.

14. The system of claim 11, wherein the optical beam spatial period converter further comprises an actuator configured to apply a force to a first edge of a first flexure island of the two or more flexure islands such that the first flexure island moves a first distance and a second flexure island of the two or more flexure islands moves a second distance, the second distance being half of the first distance.

15. The system of claim 14, wherein the actuator comprises a piezoelectric component and the piezoelectric component is configured to cause a length of the actuator to be adjustable.

16. The system of claim 14, wherein the actuator is disposed within a cavity located within the substrate.

17. The system of claim 14, wherein movement of a second flexure island of the two or more flexure islands is controlled by movement of the first flexure island.

18. The system of claim 11, further comprising a relay lens, wherein respective incoming optical beams of the incoming array of optical beams pass through respective objective lenses of the array of objective lenses before being incident on respective ones of the plurality of first spacing reflective elements, and the outgoing array of optical beams passes through the relay lens.

* * * * *